INVENTOR
Toshihiko Satake
BY
Browdy & Neimark
ATTORNEYS 3,674,514
SYSTEM FOR PREPARING PARBOILED
ROUGH RICE
Toshihiko Satake, 2–38 Nishihon-machi, Saijo-cho,
Kamo-gun, Hiroshima-ken, Japan
Filed Aug. 28, 1970, Ser. No. 67,935
Int. Cl. A23b 9/00
U.S. Cl. 99—237 R 7 Claims

ABSTRACT OF THE DISCLOSURE

A system for preparing parboiled rough rice, in which apparatus is provided for providing brown rice enwrapped in chaffs with cracks, in advance of subjecting it to moistening, steaming and drying steps, whereby the time required for properly moistening the rough rice is remarkably shortened and parboiled rough rice thus prepared become enriched because of nutritious substances which are penetrated inwardly into endosperm thereof by means of water absorbed thereinto through the cracks.

---

This invention relates to a system for preparing parboiled rough rice.

Most conventionally, parboiled rice is prepared by subjecting rough rice firstly to a moistening step and secondly a steaming step, followed by a drying step. However, such preparation is accompanied with the serious drawback that it takes more than ten hours to properly moisten rough rice unless the moistening step is held under pressure.

Hence, it is an object of the present invention to provide a novel system for preparing parboiled rough rice, in which an additional step for having brown rice crack is employed in advance of conducting the moistening step, and in the latter step the brown rice thus cracked in the former step and held enwrapped in chaffs is moistened, resulting in enabling a shortening of the time necessary for moistening the rough rice.

More specifically, it is an object of the present invention to provide a system of the type described above, wherein the cracks of brown rice enwrapped in chaffs are produced by subjecting the rice to a blast heated to a high temperature or chilled and by inducing the sudden change of temperature in the rice.

It is another object of the present invention to provide a system of the type described above, wherein the cracked brown rice enwrapped in chaffs is moistened within a high-pressure tank, whereby the time required for the moistening of rice is remarkably shortened.

It is a further object of the present invention to provide a system of the type described above, wherein in its drying step, a blast of air heated to a temperature of between 100° C. and 400° C. is applied over the rough rice which has been just steamed, whereby the time required for the drying step is shortened and it becomes possible to utilize in this step a horizontal agitating type drier which can dry articles without their lumping together, though the time for which it can hold therein the articles to be dried is short, compared to a drier of other types.

It is a still further object of the present invention to provide a system of the type described above, wherein nutritious substances of the outer coverings of brown rice penetrate inwardly into the endosperm thereof by means of water absorbed thereinto through cracks, resulting in enriching the rice, when it is polished.

With the above and other objects in view which will appear as the description proceeds, this invention resides in a novel apparatus and process substantially as hereinafter described and more particularly defined by the appended claims, it being understood that such changes in the precise embodiment of the herein-disclosed invention may be made as come within the scope of the claims.

Figure 1:
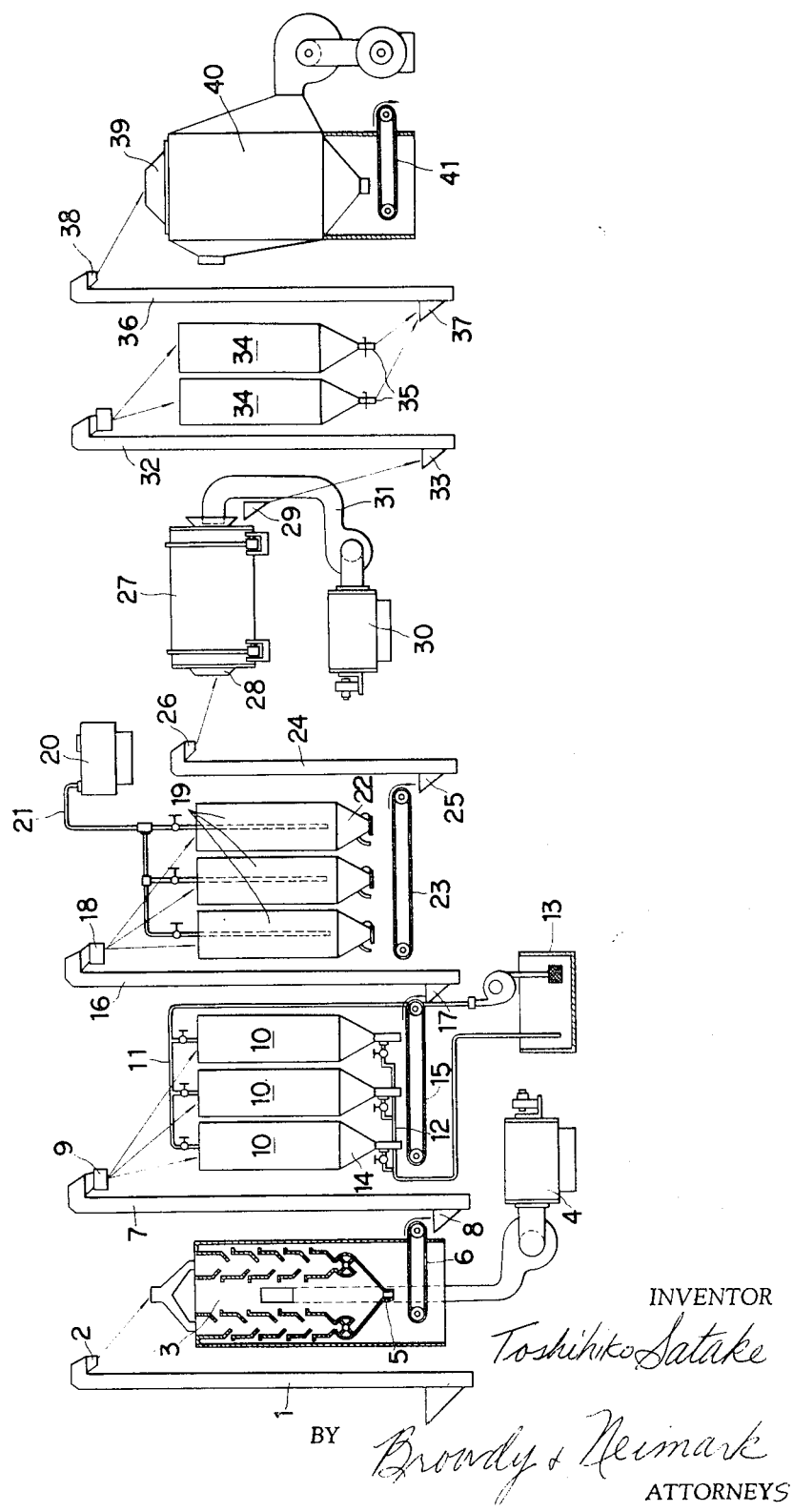
Figure 2:
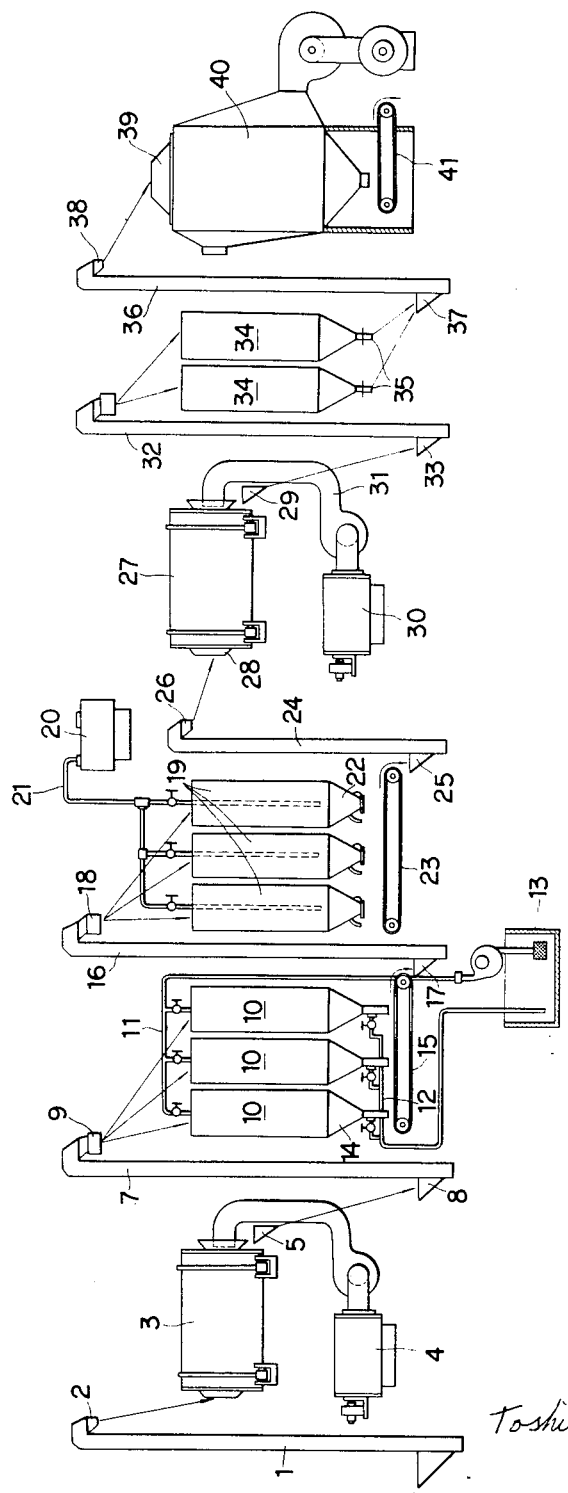

In order that the invention may be clearly understood and readily carried into effect, two examples of the invention will be more fully described with reference to the accompanying drawing, in which:

FIG. 1 is a view schematically showing the devices employed in a system in accordance with the present invention, in which cracks are produced in rough rice while it vertically flows, and FIG. 2 is a view similar to FIG. 1, in which cracks are produced in the rough rice while it is horizontally agitated.

With reference to FIG. 1, an elevator 1 for loading rough rice is provided with an outlet opening 2 which connects to an upper inlet opening of a device 3 for providing rough rice with cracks, in which the rice flows vertically. Inside the device 3, is the blast supplying outlet of a blower 4 which supplies into the device through said outlet a blast which may either be heated to a high temperature or chilled. At the bottom of the device 3, there is provided an outlet opening 5, from which the rough rice subjected to the blast comes out. When a heated blast is employed, the temperature thereof may preferably be around 150° C. Due to the heated or chilled blast applied onto the rough rice while it is descending through the device 3, the temperature of the rice suddenly changes and the brown rice enwrapped in chaffs cracks.

The rough rice thus cracked of its brown rice and brought out from the device through its outlet opening 5 is received by a belt conveyer 6 which is provided below the said opening. The rice carried by the conveyer is released therefrom at one of its horizontal ends and is supplied to the inlet opening 8 of a loading elevator 7, the upper outlet opening 9 of which opens to the upper inlet openings of a plurality of tanks 10, in which the rice is moistened. These tanks may be kept under pressure, if required. Outlet openings of a water supply tube 11 are provided at the upper inlet openings of the tanks 10, and an exhaust tube 12 is connected at one of its ends to the bottom of the tanks and at the other end to a water supply tank 13. Water circulates by means of a pump through the water supply tube 11, tanks 10, exhaust tube 12 and water supply tank 13. At the bottom of the tanks 10, there are provided outlet openings 14 which are normally closed and which serve to release the moistened rough rice when they are opened. In the above constructions, the brown rice cracked and enwrapped in chaffs is stored in the tanks 10, under water and becomes properly moistened within about two to three hours. When the tanks are kept pressurized, the time required for moistening the rice can be shortened to about twenty to thirty minutes.

A belt conveyer 15 located below the outlet opening 14 of the tanks 10, and operatively connected to a loading opening 17 of another elevator 16 provided with an outlet opening 18 carries the moistened rough rice to steaming tanks 19. Heated steam is introduced into said steaming tanks 19 by pipes 21 having one end connected to a boiler 20 and the other end connected to the tanks 19, whereby the moistened brown rice enwrapped in chaffs is steamed and becomes parboiled rice. It should be noted that during steaming, the endosperm of the rice becomes melted within the chaffs and the cracks thereof are thereby eliminated. The water content of the rice at this stage is about 35 to 45%.

The rice thus processed is further transferred to a drier 27 by means of a conveyer 23 located below the exhaust openings 22, of tanks 19 and operatively connected with an elevator 24 having a loading opening 25 and outlet opening 26. The drier 27 is of a horizontal agitating type which can dry articles without their lumping together, and hence is most suited for drying moistened articles such as moistened and steamed rough rice, though the time for which it can hold the articles to be dried is comparatively short compared to a drier of other types. In order to shorten the time necessary for drying the moistened and steamed rice, and subsequently to make it possible to utilize pipe 31 for a heated blast producing device 27 is conected to the drier 27, so that a blast heated to 100° C. to 400° C. may be introduced into the drier. The drier 27 is provided with an inlet opening 28 which connects to the outlet opening 26 of the elevator 24, and an outlet opening 29 from which the rice dried in the drier is brought out. The rice is further transferred, by means of another elevator 32 having a loading opening 33 which is connected to the outlet opening 29 of drier 27 and outlet openings, into tempering tanks 34, 34 in which the rice released from these outlet openings into the tanks is stored for a predetermined time so that the water content of rice can be properly adjusted.

Numeral 40 indicates a secondary drier, in which the rice tempered in the tanks 34, 34 and transferred thereinto by means of an elevator 36 is further dried. The elevator 36 is provided with a loading opening 37 which is connected with exhaust openings 35 of tanks 34, 34 and outlet opening 38 which is connected to upper inlet opening 39 of the secondary drier 40. Numeral 41 indicates a belt conveyer which is provided to the secondary drier for bringing out the dried rice therefrom.

The system illustrated in FIG. 2 is substantially similar to the one shown in FIG. 1, except that the device indicated by the numeral 3 for providing rough rice with cracks is of a horizontal rotating type, in which the rice flows horizontally. The portions of FIG. 2 which are identical or correspond to those of FIG. 1, are denoted by the corresponding numerals of FIG. 1.

It will be obvious to those skilled in the art that various changes may be made without departing from the scope of the invention and the invention is not to be considered limited to what is shown in the drawings and described in the specification.

What is claimed is:

1. Apparatus for preparing parboiled rough rice, which comprises means for providing brown rice enwrapped in chaffs with cracks, means operatively connected with the first-mentioned means for moistening the rice, a steaming device operatively connected with the second-mentioned means for steaming the moistened rice and a drying device operatively connected with the steaming device for drying the steamed rice, said cracks being formed in the brown rice in the first-mentioned means by subjecting said rice to a blast having a temperature extremely different from that of the rice.

2. Apparatus as claimed in claim 1, in which the first-mentioned means has means for moving the rough rice vertically therethrough and for applying a blast heated to a temperature of about 150° C. to said rice.

3. Apparatus as claimed in claim 1, in which the first-mentioned means has means for moving the rough rice horizontally therethrough and for applying a blast heated to a temperature of bout 150° C. to said rice.

4. Apparatus as claimed in claim 1, in which the first-mentioned means has means for moving the rough rice vertically therethrough and for applying a chilled blast to said rice.

5. Apparatus as claimed in claim 1, in which the first-mentioned means has means for moving the rough rice horizontally therethrough and for applying a chilled blast to said rice.

6. Apparatus as claimed in claim 1, in which means are provided for maintaining said second-mentioned means for moistening the rice under pressure.

7. Apparatus as claimed in claim 1, in which means are provided in said drying device for transferring the steamed rice through said drying device, and for forcibly introducing a blast of air heated to a temperature between 100° C. and 400° C. thereto.

References Cited
UNITED STATES PATENTS

| | | | |
|---|---|---|---|
| 2,498,573 | 2/1950 | Ozai-Durrani | 99—237 |
| 2,571,555 | 10/1951 | Fernandes | 99—237 |
| 3,083,102 | 3/1963 | Leduc | 99—80 |
| 3,085,011 | 4/1963 | Wayne | 99—80 |

ROBERT W. JENKINS, Primary Examiner

U.S. Cl. X.R.

99—80 R